(12) United States Patent
Ebisuzaki et al.

(10) Patent No.: US 9,960,453 B2
(45) Date of Patent: May 1, 2018

(54) LITHIUM ION SECONDARY BATTERY AND SYSTEM USING SAME

(71) Applicant: TOYOTA JIDOSHA KABUSHIKI KAISHA, Toyota-shi, Aichi (JP)

(72) Inventors: Hideyo Ebisuzaki, Toyota (JP); Shinobu Okayama, Miyoshi (JP); Tetsuro Kobayashi, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 210 days.

(21) Appl. No.: 15/084,082

(22) Filed: Mar. 29, 2016

(65) Prior Publication Data

US 2016/0294017 A1 Oct. 6, 2016

(30) Foreign Application Priority Data

Mar. 31, 2015 (JP) ................................. 2015-074484

(51) Int. Cl.
*H01M 10/0587* (2010.01)
*H01M 2/18* (2006.01)
(Continued)

(52) U.S. Cl.
CPC ..... *H01M 10/0587* (2013.01); *H01M 2/0272* (2013.01); *H01M 2/18* (2013.01);
(Continued)

(58) Field of Classification Search
None
See application file for complete search history.

(56) References Cited

U.S. PATENT DOCUMENTS

2011/0086265 A1* 4/2011 Suzuki ................ H01M 2/0267
 429/186
2014/0377607 A1* 12/2014 Urano ............... H01M 10/0431
 429/94

FOREIGN PATENT DOCUMENTS

CN 102067355 A 5/2011
JP 63-291370 A 11/1988
(Continued)

*Primary Examiner* — Barbara L Gilliam
*Assistant Examiner* — Adam A Arciero
(74) *Attorney, Agent, or Firm* — Sughrue Mion, PLLC

(57) ABSTRACT

Provided is a lithium ion secondary battery that enables lithium ion replenishment in a short period of time. The lithium ion secondary battery disclosed herein is provided with a wound electrode assembly in which a long sheet-shaped positive electrode and a long sheet-shaped negative electrode are wound such that the negative electrode is positioned on the outer side of the positive electrode; a third electrode that is disposed outside the wound electrode assembly and that has an Li supply source capable of supplying lithium ion; and a porous insulating film that is disposed between the wound electrode assembly and the third electrode and that is formed from a material usable as a separator in a battery. In this lithium ion secondary battery, the third electrode has a portion facing, across the insulating film, an outer surface of the negative electrode that constitutes the outermost circumference of the negative electrode of the wound electrode assembly, and has a portion facing, across the insulating film, a wound electrode assembly open end face that communicates with the interior of the wound electrode assembly and is an end face of the wound electrode assembly along the direction of the winding axis.

4 Claims, 5 Drawing Sheets

(51) Int. Cl.
    *H01M 4/131*     (2010.01)
    *H01M 10/46*     (2006.01)
    *H01M 4/525*     (2010.01)
    *H01M 4/505*     (2010.01)
    *H01M 10/0525*     (2010.01)
    *H01M 10/48*     (2006.01)
    *H01M 2/02*     (2006.01)
    *H01M 4/02*     (2006.01)

(52) U.S. Cl.
    CPC ....... *H01M 10/0525* (2013.01); *H01M 10/46* (2013.01); *H01M 10/48* (2013.01); *H01M 4/131* (2013.01); *H01M 4/505* (2013.01); *H01M 4/525* (2013.01); *H01M 2004/028* (2013.01); *H01M 2220/20* (2013.01); *Y02E 60/122* (2013.01); *Y02T 10/7011* (2013.01)

(56) References Cited

FOREIGN PATENT DOCUMENTS

| | | | |
|---|---|---|---|
| JP | 8-190934 A | | 7/1996 |
| JP | 2002-324585 A | | 11/2002 |
| JP | 2008-042003 A | | 2/2008 |
| JP | 2009-188141 A | | 8/2009 |
| JP | 2009188141 A | * | 8/2009 |
| JP | 2011-077156 A | | 4/2011 |
| JP | 2011-103178 A | | 5/2011 |
| JP | 2012-195055 A | | 10/2012 |
| JP | 2012-248556 A | | 12/2012 |
| JP | 2013-251119 A | | 12/2013 |
| KR | 10-2011-0018439 A | | 2/2011 |

\* cited by examiner

LITHIUM ION SECONDARY BATTERY AND SYSTEM USING SAME

BACKGROUND OF THE INVENTION

1. Field of the Invention

The present invention relates to a lithium ion secondary battery and to a system that uses this lithium ion secondary battery.

This application claims priority based on Japanese Patent Application No. 2015-074484 filed Mar. 31, 2015, the entire contents of which are incorporated herein by reference.

2. Description of the Related Art

Lithium ion secondary batteries are lighter and have higher energy densities than conventional batteries and for these reasons have in recent years entered into use as vehicular drive power sources and as so-called portable power sources for personal computers, mobile terminals, and so forth. The expectation is that lithium ion secondary batteries will become increasingly widespread in the future in particular as high-output drive power sources for vehicles such as electric vehicles (EV), hybrid vehicles (HV), and plug-in hybrid vehicles (PHV).

It is known, however, that lithium ion secondary batteries undergo a decline in battery capacity when subjected to repetitive charge/discharge on a long-term basis. One cause of this decline in battery capacity is the consumption of lithium due to the occurrence of side reactions during charge/discharge and the resulting decrease in the mobile lithium ion.

In response to the decline in battery capacity that occurs for this reason, arts have been proposed in which the lithium ion secondary battery is provided with a third electrode that functions as a lithium ion supply source. Specifically, Japanese Patent Application Laid-open No. H8-190934 describes the disposition of a third electrode in a lithium ion secondary battery by wrapping the outermost circumference of the electrode group with a lithium foil that functions as a lithium ion supply electrode. Japanese Patent Application Laid-open No. 2002-324585 describes the disposition of a third electrode in a lithium ion secondary battery, wherein a flat plate-shaped third electrode, in which lithium metal is attached to a strip-shaped current collector plate, is disposed with a flat face of the third electrode perpendicular to the winding axis of the wound electrode assembly. When a battery provided with such a third electrode exhibits a decline in its battery capacity, lithium ion can be released from the third electrode by passing current between the third electrode and the positive electrode or negative electrode. As a result, the lithium ion within the battery can be replenished and the battery capacity can be recovered.

SUMMARY OF THE INVENTION

However, investigations by the present inventor demonstrated a problem with the arts described in Japanese Patent Application Laid-open No. H8-190934 and Japanese Patent Application Laid-open No. 2002-324585 in that a long period of time is required for lithium ion replenishment. It is convenient that the processing time for capacity recovery for an in-use lithium ion secondary battery be as short as possible, and thus there is demand for original innovation that will enable the realization of a sufficient capacity recovery in a short period of time.

The present invention was therefore created in order to solve the existing problem identified above, and an object of the present invention is to provide a lithium ion secondary battery that has a third electrode that can function as a lithium ion supply source, wherein this lithium ion secondary battery enables lithium ion replenishment to be carried out in a short period of time.

The lithium ion secondary battery disclosed herein is provided with a wound electrode assembly in which a long sheet-shaped positive electrode and a long sheet-shaped negative electrode are wound using a direction orthogonal to the length direction as a winding axis such that the negative electrode is positioned on the outer side of the positive electrode; a third electrode that is disposed outside the wound electrode assembly and that has an Li supply source capable of supplying lithium ion; and a porous insulating film that is disposed between the wound electrode assembly and the third electrode and that is formed from a material usable as a separator in a battery.

In addition, in the lithium ion secondary battery disclosed herein, the third electrode has a portion facing, across the insulating film, an outer surface of the negative electrode that constitutes the outermost circumference of the negative electrode of the wound electrode assembly, and has a portion facing, across the insulating film, a wound electrode assembly open end face that communicates with the interior of the wound electrode assembly and is an end face of the wound electrode assembly along the direction of the winding axis.

This structure supports and facilitates the movement of lithium ion—supplied from the third electrode during a capacity recovery process carried out by conduction between the third electrode and an electrode (typically the positive electrode) of the wound electrode assembly—into the negative electrode residing at the outer periphery of the wound electrode assembly and into the interior of the wound electrode assembly from the wound electrode assembly open end face. As a consequence, the lithium ion secondary battery disclosed herein can realize replenishment with an adequate amount of lithium ion in a short period of time during the capacity recovery process.

In a preferred aspect of the lithium ion secondary battery disclosed herein, the lithium ion secondary battery is further provided with an electroconductive battery case that houses the wound electrode assembly, and the third electrode is housed in the battery case so as to be electrically conductive with the battery case.

This structure, by using just a connection through an external circuit between the battery case and the positive electrode or negative electrode of the wound electrode assembly, makes it possible to easily establish an electrical connection therebetween and does so without having to provide a separate external connection terminal to the third electrode. As a consequence, the lithium ion secondary battery of this aspect facilitates the lithium ion replenishment operation (capacity recovery process).

In another preferred aspect of the lithium ion secondary battery disclosed herein, the insulating film has a bag shape and the wound electrode assembly is inserted into this bag-shaped insulating film. This structure makes possible the facile production of a lithium ion secondary battery in which the wound electrode assembly is securely and reliably insulated from the third electrode.

In a preferred aspect of the lithium ion secondary battery disclosed herein, the third electrode has, as the Li supply source, an active material that is the same as a positive electrode active material included in the positive electrode. This structure does not require a separate preparation of a positive electrode active material and is therefore advantageous from a production standpoint.

In a preferred aspect of the lithium ion secondary battery disclosed herein, the wound electrode assembly is formed into a flat shape that has two flat faces between the two end faces in the direction of the winding axis, and the insulating film is disposed in a state of intimate contact with the two flat faces and faces of the third electrode that face the flat faces.

With this structure, the distance between the wound electrode assembly and the third electrode is typically only the thickness of this thin insulating film, which has the same thickness as a separator. As a result, this structure further facilitates the movement of the lithium ion to the outer periphery of the wound electrode assembly from the third electrode and supports an even more rapid recovery of the battery capacity through lithium ion replenishment.

As one aspect for solving the problem identified above, the present invention also provides a capacity recovery system for lithium ion secondary batteries that uses the lithium ion secondary battery disclosed herein.

That is, the battery capacity recovery system provided by the present invention contains a lithium ion secondary battery according to any of the aspects disclosed herein, a monitoring apparatus that monitors the battery capacity of the lithium ion secondary battery, and a capacity recovery circuit that electrically connects the third electrode to the positive electrode in the lithium ion secondary battery. The thusly structured battery capacity recovery system makes it possible—when, for example, the battery capacity has reached a level requiring replenishment as indicated by the monitoring apparatus—to rapidly carry out, through the aforementioned capacity recovery circuit, lithium ion replenishment (raising the battery capacity) into the wound electrode assembly of the lithium ion secondary battery disclosed herein.

DESCRIPTION OF THE PREFERRED EMBODIMENTS

An embodiment according to the present invention is described in the following with reference to the figures. In the figures, members and positions that exercise the same function are assigned the same reference number and duplicate descriptions have been omitted or simplified. The dimensional relationships (length, width, thickness, and so forth) in the individual figures do not necessarily reflect actual dimensional relationships. Moreover, matters required for the execution of the present invention but not particularly described in this Specification can be understood as design matters for the individual skilled in the art based on the conventional art in the pertinent field.

In this Specification, "lithium ion secondary battery" refers to a secondary battery in which the lithium ion is used as an electrolyte ion and charging and discharging are realized by the movement of the lithium ion between a positive electrode and a negative electrode.

In addition, the "positive electrode active material" and the "negative electrode active material" in this Specification refer to active materials (the positive electrode active material and the negative electrode active material) capable of the reversible insertion and extraction (typically intercalation and de-intercalation) of a chemical species (i.e., the lithium ion) that functions as the charge carrier in the lithium ion secondary battery.

The present invention is described in detail in the following using the example, as one embodiment of a lithium ion secondary battery, of a lithium ion secondary battery having a configuration in which a flat wound electrode assembly is housed in a rectangular case. This should not be taken to mean, however, that the present invention is limited to or by the description of this embodiment.

[The Structure of the Overall Battery]

Figure 1:
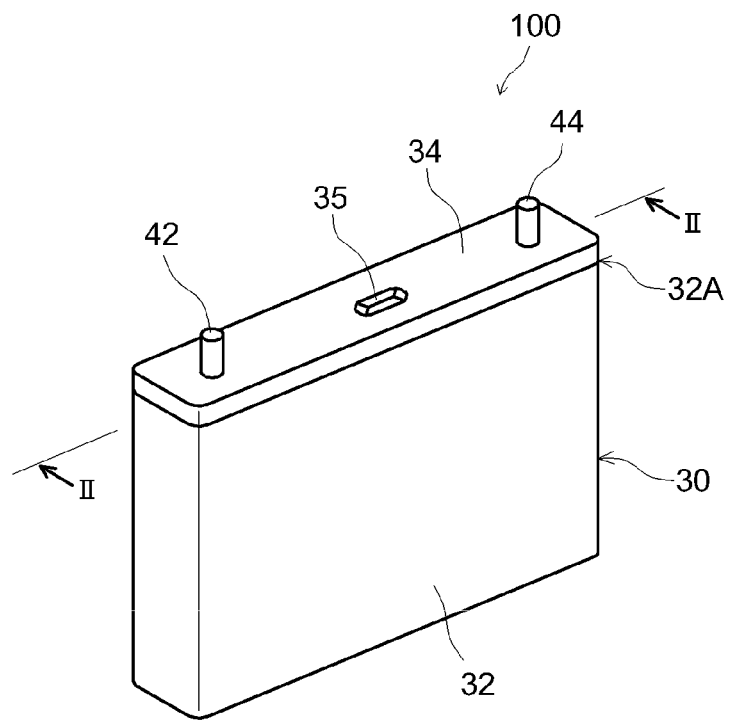
FIG. 1 is a perspective diagram that schematically shows the external appearance of a lithium ion secondary battery according to an embodiment.
Figure 2:
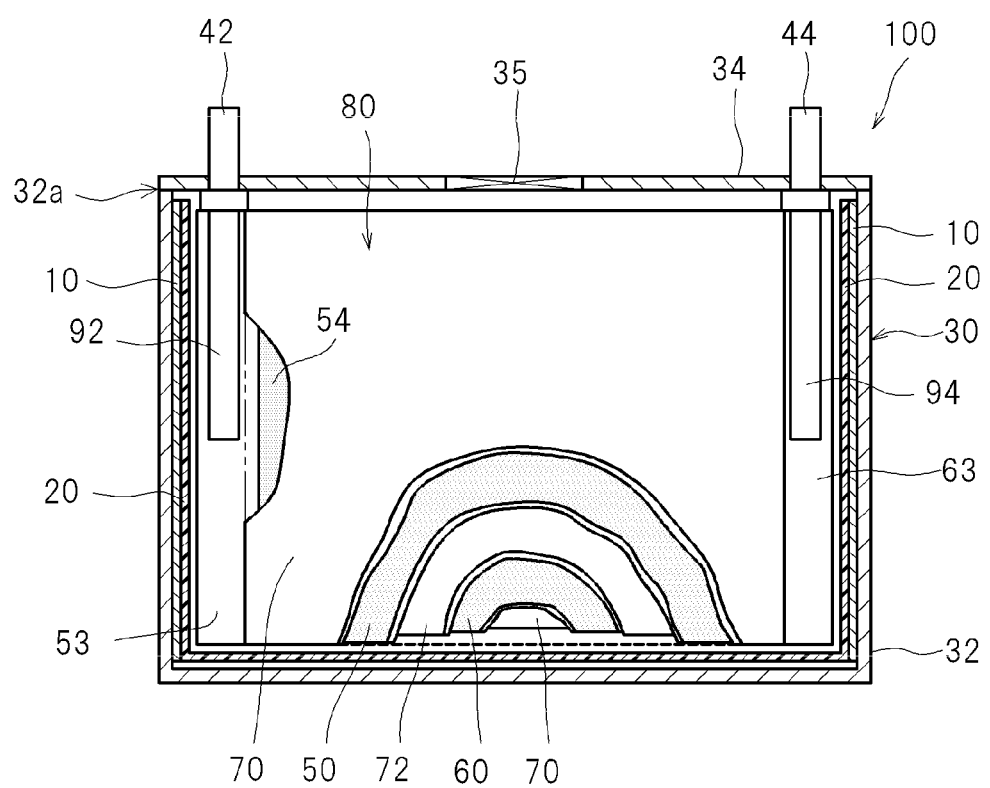
FIG. 2 is a diagram of the cross section at the II-II line in FIG. 1.
Figure 3:
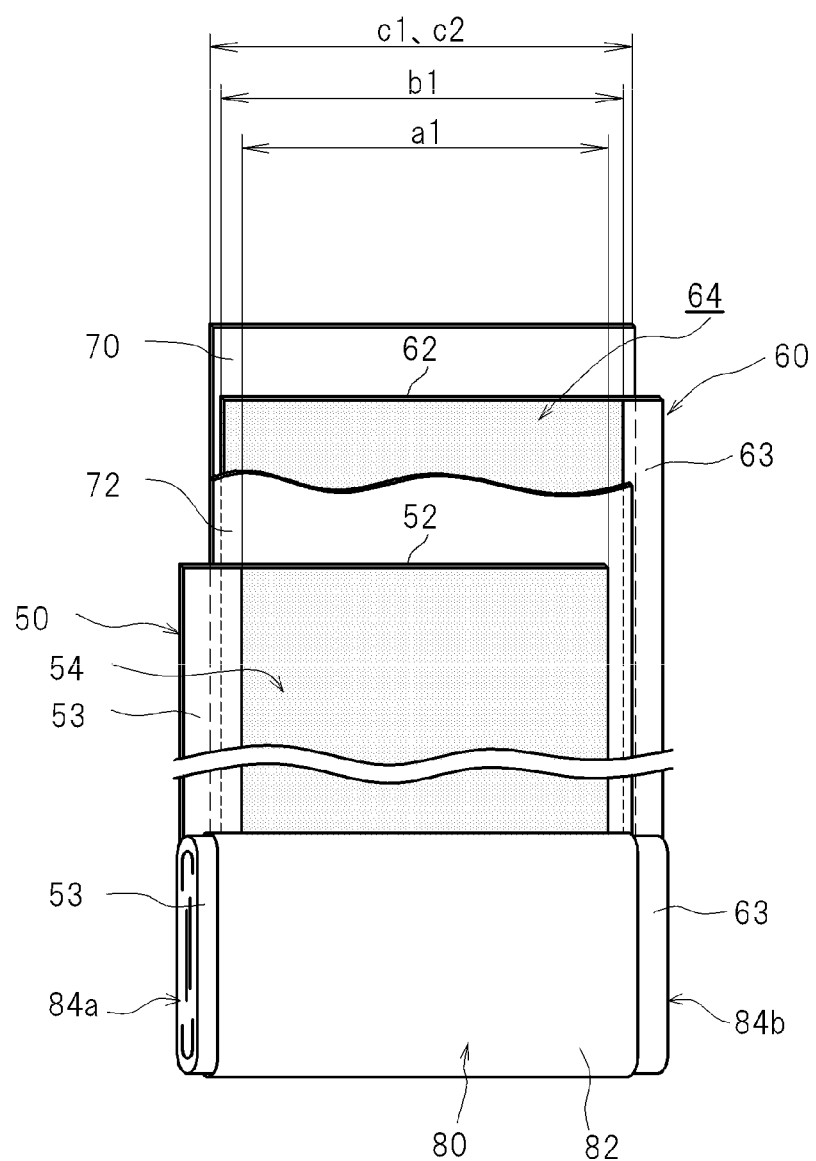
FIG. 3 is a diagram that shows the structure of the wound electrode assembly of a lithium ion secondary battery according to an embodiment.

FIG. 1 is a perspective diagram that schematically shows the external appearance of a lithium ion secondary battery 100 according to the present embodiment. FIG. 2 is a cross-sectional view along the II-II line in FIG. 1 and shows the interior of the battery. FIG. 3 is a diagram that shows the structure of a wound electrode assembly 80 of the lithium ion secondary battery 100.

As shown in FIG. 1, the battery case 30 of the lithium ion secondary battery 100 according to the present embodiment is a so-called rectangular case (typically a rectangular parallelepiped) that has corners at eight locations and that is formed into a box shape having an internal space that corresponds to the flat wound electrode assembly 80, infra. This battery case 30 is provided with a case main body 32 and a lid 34. The case main body 32 is a flat, box-shaped container that has the shape of a rectangular cylinder having a bottom and that is open at one side (the upper side). The lid 34 is a member that is attached to the opening (the opening in the upper side) in the case main body 32 and thereby closes this opening.

As shown in FIG. 2, the internal space of this battery case 30 houses the wound electrode assembly 80 (refer to FIG. 3), which has been flattened in one direction orthogonal to its winding axis. A third electrode 10 and an insulating film 20, infra, are disposed between the case main body 32 and the wound electrode assembly 80.

A positive electrode terminal 42 and a negative electrode terminal 44 are attached in the lid 34 of the battery case 30. The positive electrode terminal 42 and the negative electrode terminal 44 both pass through the battery case 30 (the lid 34) and extend to the outside of the battery case 30. A safety valve 35 is also provided in the lid 34. A fill port (not shown) for filling nonaqueous electrolyte solution during battery fabrication is provided next to the safety valve 35. A seam 32a between the lid 34 and the case main body 32 is sealed by, for example, laser welding.

[The Electrode Assembly]

As shown in FIGS. 2 and 3, the wound electrode assembly 80 used in the present embodiment is provided by stacking a long sheet-shaped positive electrode (the positive electrode sheet) 50, a long sheet-shaped negative electrode (the negative electrode sheet) 60, and two long sheet-shaped separators 70 and 72 and winding. Here, winding is carried out using the direction orthogonal to the length direction as the winding axis, such that the negative electrode 60 is positioned on the outer side of the positive electrode 50. In the present embodiment, the outermost circumference of the wound electrode assembly 80 is the separator 70, but the negative electrode 60 may be made the outermost circumference by adjusting the length of the separator 70.

As shown in FIG. 3, the positive electrode sheet 50 has a long positive electrode current collector 52 (positive electrode core). In addition, the positive electrode sheet 50 has both a positive electrode active material layer-free region (uncoated region) 53 and a positive electrode active material layer 54. The positive electrode active material layer-free region 53 is disposed along the edge at one side, considered in the width direction (direction orthogonal to the length direction), of the positive electrode current collector 52. In the present embodiment, the positive electrode active material layer 54 is formed on both sides of the positive electrode current collector 52, but it may also be formed on only one side of the positive electrode current collector 52.

The positive electrode active material layer 54 is a layer that contains a positive electrode active material. The positive electrode active material layer 54 typically may have a configuration in which, through the use of a binder, the positive electrode active material is both internally cohered along with an electroconductive material as well as joined to the positive electrode current collector 52. Such a positive electrode sheet 50 can typically be fabricated, for example, by preparing a positive electrode paste (the paste includes the forms known as slurries, inks, and so forth) by dispersing the positive electrode active material, an electroconductive material, and a binder in a suitable solvent; supplying this positive electrode paste to a surface of the positive electrode current collector 52, excluding the positive electrode active material layer-free region 53; and drying to remove the solvent. An electroconductive member formed from a metal with an excellent electroconductivity (for example, aluminum, nickel, titanium, and stainless steel) can be suitably used as the positive electrode current collector 52. An aluminum foil is used as the positive electrode current collector 52 here.

A lithium-containing compound (for example, a lithium transition metal composite oxide) that contains the element lithium and one or two or more transition metal elements, and that is a material capable of the insertion and extraction of the lithium ion, can be advantageously used as the positive electrode active material. Preferred examples are lithium transition metal oxides that have a layered rock salt or spinel crystalline structure. Examples are lithium nickel composite oxides (for example, $LiNiO_2$), lithium cobalt composite oxides (for example, $LiCoO_2$), and lithium manganese composite oxides (for example, $LiMn_2O_4$), as well as lithiated ternary composite oxides such as lithium nickel cobalt manganese composite oxides (for example, $LiNi_{1/3}Co_{1/3}Mn_{1/3}O_2$). Polyanion-type compounds as represented by the general formula $LiMPO_4$ or $LiMVO_4$, $Li_2MSiO_4$ (M in the formulas is at least one or more elements selected from Co, Ni, Mn, and Fe) or the like may also be used as the positive electrode active material.

The electroconductive material may be an electroconductive material as heretofore used in lithium ion secondary batteries of this type and can be exemplified by carbon powders, e.g., carbon black and so forth, and by carbon materials such as carbon fibers and so forth.

The same binders as used in the positive electrodes of ordinary lithium ion secondary batteries can be used as appropriate as the binder. When, for example, the positive electrode active material layer 54 is formed by supplying a paste, and when a nonaqueous paste is used, a polymer material that dissolves in organic solvent can be used, e.g., a vinyl halide resin such as polyvinylidene fluoride (PVDF), polyvinylidene chloride (PVDC), and so forth, or a polyalkylene oxide such as polyethylene oxide (PEO) and so forth. When an aqueous paste is used, the use is preferred of a water-soluble polymer material or a water-dispersible polymer material, e.g., polytetrafluoroethylene (PTFE), carboxymethyl cellulose (CMC), styrene-butadiene rubber (SBR), and so forth.

Any aqueous solvent or nonaqueous solvent (organic solvent) adapted to the properties of the binder used can be used as the solvent for dispersing the materials that constitute the positive electrode active material layer 54. For example, water or a mixed solvent in which water is the majority can be used as the aqueous solvent. For example, N-methyl-2-pyrrolidone (NMP) can be advantageously used for the nonaqueous solvent.

As shown in FIG. 3, the negative electrode sheet 60 has a long negative electrode current collector 62 (negative electrode core). In addition, the negative electrode sheet 60 has both a negative electrode active material layer-free region (uncoated region) 63 and a negative electrode active material layer 64. The negative electrode active material layer-free region 63 is disposed along the edge at one side, considered in the width direction, of the negative electrode current collector 62. In the present embodiment, the negative electrode active material layer 64 is formed on both sides of the negative electrode current collector 62, but it may also be formed on only one side of the negative electrode current collector 62.

The negative electrode active material layer 64 is a layer that contains a negative electrode active material. The negative electrode active material layer 64 typically may have a configuration in which, through the use of a binder, the negative electrode active material is both internally cohered as well as joined to the negative electrode current collector 62. Such a negative electrode sheet 60 can be fabricated, for example, by preparing a negative electrode paste by dispersing the negative electrode active material and binder in a suitable solvent (for example, water or N-methyl-2-pyrrolidone and preferably water); supplying this negative electrode paste to the surface of the negative electrode current collector 62; and drying to remove the solvent. An electroconductive member formed from a metal with an excellent electroconductivity (for example, copper, nickel, titanium, and stainless steel) is suitably used as the negative electrode current collector 62. A copper foil is used as the negative electrode current collector 62 here.

There are no particular limitations on the negative electrode active material, and the various materials known to be usable as the negative electrode active material of this type of lithium ion secondary battery may be used, either as a single selection by itself or as the combination (as a mixture or made into composite) of two or more selections. Preferred examples are carbon materials such as graphite, poorly graphitizable carbon (hard carbon), easily graphitizable carbon (soft carbon), carbon nanotubes, and structures in which the preceding are combined. The use of amorphous carbon-coated graphite as the negative electrode active material can realize a lithium ion secondary battery that in particular has a large capacity, a high energy density, and excellent input/output characteristics.

The same binders as used in the negative electrodes of ordinary lithium ion secondary batteries can be used as appropriate as the binder. For example, the same binder as in the positive electrode sheet 50 may be used.

A thickener can be incorporated depending on the method of forming the negative electrode active material layer 64. This thickener may be the same as the previously described binder, and, for example, a water-soluble or water-dispersible polymer such as methyl cellulose (MC) or carboxylmethyl cellulose (CMC) may be used.

The separators 70, 72 are members that separate the positive electrode sheet 50 from the negative electrode sheet 60. The separators 70, 72 enable the through-migration of the lithium ion and are structured to have the ability to hold a nonaqueous electrolyte and to have a shutdown function. A porous film or a nonwoven fabric made of a resin, e.g., polyethylene (PE), polypropylene (PP), and so forth, can be used as the separators 70, 72.

There are no particular limitations on the thickness of the separators 70, 72, but approximately 5 μm to 40 μm is preferred. By having the thickness of the separators 70, 72 be in the indicated range, a better ion permeability is achieved for the separators 70, 72 and the occurrence of film rupture is made more difficult.

A heat-resistant layer (HRL) may be disposed on the faces of the separators 70, 72 that face the negative electrode.

The wound electrode assembly 80 can be fabricated by stacking the positive electrode sheet 50 with the negative electrode sheet 60 with the separators 70, 72 interposed between the positive electrode active material layer 54 and the negative electrode active material layer 64; winding in the long direction; and thereafter flattening into a flat shape by pressing the obtained winding from a side direction.

In the wound electrode assembly 80, the positive electrode active material layer-free region (uncoated region) 53 of the positive electrode sheet 50 and the negative electrode active material layer-free region (uncoated region) 63 of the negative electrode sheet 60 protrude out at opposite sides from each other considered in the width direction (i.e., the direction along the winding axis) of the separators 70, 72. A positive electrode current collection terminal 92 is attached to the positive electrode active material layer-free region 53 and is connected to the aforementioned positive electrode terminal 42. The positive electrode current collection terminal 92 is constituted of, for example, aluminum or an aluminum alloy. As shown in FIG. 2, in this example the positive electrode current collection terminal 92 extends to the central region of the positive electrode active material layer-free region 53 of the wound electrode assembly 80. The tip of the positive electrode current collection terminal 92 is welded (for example, by ultrasound welding) to the central region of the positive electrode active material layer-free region 53. In addition, a negative electrode current collection terminal 94 is attached to the negative electrode active material layer-free region 63 and is connected to the aforementioned negative electrode terminal 44. The negative electrode current collection terminal 94 is constituted of, for example, copper or a copper alloy. The negative electrode current collection terminal 94 extends to the central region of the negative electrode active material layer-free region 63 of the wound electrode assembly 80. The tip of the negative electrode current collection terminal 94 is welded (for example, by resistance welding) to the central region of the negative electrode active material layer-free region 63.

Accordingly, the two end faces 84a, 84b, considered along the direction of the winding axis, of the wound electrode assembly 80 are, respectively, a face 84a formed by the stacking of the exposed positive electrode current collector 52 to form a bundle and a face 84b formed by the stacking of the exposed negative electrode current collector 62 to form a bundle, and thus constitute open end faces 84a, 84b that communicate with the interior of the wound electrode assembly 80. In addition, the two flat faces 82 are present between the two end faces 84a, 84b considered along the direction of the winding axis.

In the present embodiment, and as shown in FIG. 3, the width b1 of the negative electrode active material layer 64 is a little larger than the width a1 of the positive electrode active material layer 54. Moreover, the widths c1, c2 of the separators 70, 72 are slightly larger than the width b1 of the negative electrode active material layer 64 (c1, c2>b1>a1). The positive electrode sheet 50, the negative electrode sheet 60, and the separators 70, 72 are equal in the length direction and are stacked in the following sequence: positive electrode sheet 50, separator 70, negative electrode sheet 60, separator 72. Moreover, stacking is carried out with the positive electrode active material layer-free region (uncoated region) 53 of the positive electrode sheet 50 and the negative electrode active material layer-free region (uncoated region) 63 of the negative electrode sheet 60 protruding out at opposite sides from each other considered in the width direction of the separators 70, 72. The stacked sheet material is wound around the winding axis, which has been set in the width direction.

[The Third Electrode]

Figure 4:
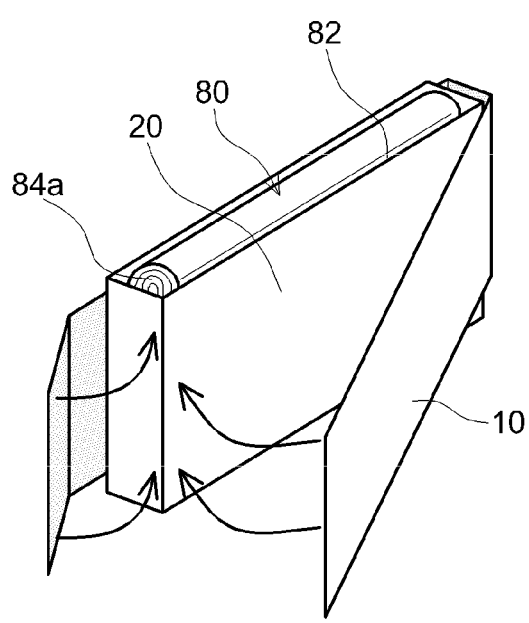
FIG. 4 is a perspective diagram that schematically shows the third electrode and the insulating film that are disposed to the outside of the wound electrode assembly of a lithium ion secondary battery according to an embodiment.

The third electrode 10 is located outside the wound electrode assembly 80. Under these circumstances, and as shown in FIG. 4, the third electrode 10 has portions that face the outer surface of the negative electrode 60 that constitutes the outermost circumference of the negative electrode 60 of the wound electrode assembly 80, and has portions that face the wound electrode assembly open end faces 84a, 84b, which are the end faces of the wound electrode assembly 80 along the direction of the winding axis. In the present embodiment, and as shown in FIG. 4, the third electrode 10 specifically is formed into a strip-shaped sheet and is positioned on the outer periphery of the wound electrode assembly 80 so as to face the two flat faces 82 of the wound electrode assembly 80, which are the outer surfaces of the negative electrode 60 that constitutes the outermost circumference of the negative electrode 60 of the wound electrode assembly 80, and so as to face the wound electrode assembly open end faces 84a, 84b. The third electrode 10 need not face the entire face without omission of a flat face 82 of the wound electrode assembly 80 and may face only a portion. In addition, the third electrode 10 need not face the entire surface of the wound electrode assembly open end faces 84a, 84b and may face only a portion. For example, it may face just one (for example, the open end face 84a on the side where the positive electrode current collector 52 is exposed) of the wound electrode assembly open end faces of the wound electrode assembly open end faces 84a, 84b present at the two ends considered along the direction of the winding axis.

The third electrode 10 has an Li supply source that is capable of supplying lithium ion. This Li supply source can be exemplified by lithium metal, but those substances usable as the positive electrode active material as described above are more preferred for the Li supply source. Accordingly, an advantageous configuration for the third electrode is a structure that has an active material layer containing a positive electrode active material (also referred to herebelow as the "third electrode active material layer"), on a surface (i.e., the surface facing the wound electrode assembly 80) of a substrate formed from a thin metal plate, e.g., aluminum foil. For example, the third electrode active material layer may have the same structure as the positive electrode active material layer 54 of the wound electrode assembly 80. That is, it can be formed using the same positive electrode active material, electroconductive material, and binder as used for the positive electrode active material layer 54. The positive electrode active material and so forth used for the third electrode active material layer may be the same as, or may differ from, those in the positive electrode active material layer 54, but are preferably the same as those in the positive electrode active material layer 54. The use of the same positive electrode active material in the third electrode active material layer as in the positive electrode active material layer 54 is advantageous in terms of production because it is then not necessary to carry out a separate preparation of a positive electrode active material.

A third electrode 10 having such a configuration can use the same metal substrate (typically an aluminum foil) as for the positive electrode current collector 52. In addition, the method for forming the third electrode active material layer may be the same as for the positive electrode active material layer 54. It is sufficient to form the third electrode active material layer only on one side of the current collector sheet, and the side of the current collector sheet on which the third electrode active material layer is disposed is then placed on the wound electrode assembly 80 side.

The third electrode 10 may be formed by disposing the third electrode active material layer on the surface of the battery case 30. For example, the following method may be carried out in order to place the third electrode active material layer on the surface of the battery case 30. First, a positive electrode paste—prepared by dispersing a positive electrode active material, electroconductive material, and binder in a suitable solvent—is filled into the battery case 30. The battery case 30 is then introduced for about 30 minutes into a hot bath apparatus at about 60° C., followed by the discharge of the positive electrode paste from the battery case 30. The third electrode active material layer is then formed on the surface of the battery case 30 by introducing the battery case 30 into a dryer and drying for about 10 minutes at about 120° C.

In FIG. 4, a single sheet of the third electrode 10 is disposed at the exterior of the flat faces 82 and the open end faces 84a, 84b of the wound electrode assembly 80; however, the wound electrode assembly 80 need not necessarily be surrounded by a single sheet of the third electrode 10. For example, four sheets of the third electrode, respectively facing the two flat faces 82 and the wound electrode assembly open end faces 84a, 84b of the wound electrode assembly 80, may be disposed to the outside of the wound electrode assembly 80. In this case, the four sheets of the third electrode may be disposed in contact with each other surrounding the wound electrode assembly 80 (i.e., enclosing the outer peripheral face of the wound electrode assembly 80), or may be disposed outside the wound electrode assembly 80 separated from each other.

[The Insulating Film]

An insulating film 20 that separates the wound electrode assembly 80 from the third electrode 10 is placed between the wound electrode assembly 80 and the third electrode 10. This insulating film 20 prevents direct contact between the third electrode 10 and the wound electrode assembly 80, which is the power-generating element, and can thereby secure insulation between the electrode assembly 80 and the third electrode 10. As long as it can separate the electrode assembly 80 from the third electrode 10, there are no particular limitations on the shape of the insulating film 20; however, in the present embodiment, and as shown in FIGS. 2 and 4, the insulating film 20 has a bag shape (in particular the shape of a bag provided with a bottom and having an opening at the upper end (the lid 34 side)) and the wound electrode assembly 80 is inserted into the bag-shaped insulating film 20. The use of a bag shape for the insulating film 20 makes it possible to securely insulate the wound electrode assembly 80 from the third electrode 10 while also achieving insulation between the wound electrode assembly 80 and the battery case 30.

The insulating film 20 is formed from a material that can be used as a separator in a battery so as to enable the permeation of the lithium ion. It is specifically formed from a porous film or nonwoven fabric made of a resin such as polyethylene (PE), polypropylene (PP), polyester, cellulose, polyamide, and so forth. Among these, a porous film of a polyolefin resin such as PE or PP is preferred. The insulating film 20 may be a single-layer structure constructed from a single porous film or nonwoven fabric, or may be a structure in which two or more porous films or nonwoven fabrics having different materials or properties (for example, the average thickness or porosity) are stacked (for example, a three-layer structure in which a PP layer is laminated on both sides of a PE layer). The material of the insulating film 20 may be the same as or may differ from that of the separators 70, 72.

The thickness of the insulating film 20 may be the same as the thickness of the separators 70, 72 and is preferably about 5 μm to 40 μm (for example, 10 μm to 30 μm and typically 15 μm to 25 μm). The thickness of the insulating film 20 may be the same as or may differ from that of the separators 70, 72.

In the lithium ion secondary battery 100 according to the present embodiment, the third electrode 10 can be electrically connected to the positive electrode 50 (positive electrode terminal 42) or the negative electrode 60 (negative electrode terminal 44) by, inter alia, an external circuit that is not a structural element of the lithium ion secondary battery 100. In order to enable the electrical connection, a terminal that extends outside the battery case (a terminal for connection to the external circuit) may be provided to the third electrode 10, but in the present embodiment the battery case 30 is electrically conductive and the third electrode 10 is housed in the battery case 30 so as to be electrically conductive with the battery case 30. Specifically, the third electrode 10 is disposed within the battery case 30 in contact with the inner wall of the battery case 30. Such a structure enables the electrical connection of the external circuit to be easily established just by connection of the battery case 30 with the positive electrode 50 (positive electrode terminal 42) or the negative electrode 60 (negative electrode terminal 44) and thus facilitates the execution of the process of replenishing the lithium ion in the lithium ion secondary battery 100 (capacity recovery process), infra.

The material of the battery case 30 is preferably a metal material such as aluminum, stainless steel, nickel-plated steel, and so forth, and the battery case 30 (specifically the main body 32 and the lid 34) is more preferably made of aluminum or an aluminum alloy. When a terminal to the third electrode 10 is put in place, a battery case 30 made of a resin may also be used.

An electrolyte solution (not shown) is filled into the interior of the battery case 30. A nonaqueous electrolyte solution containing a nonaqueous solvent and a lithium salt (supporting electrolyte) soluble in the solvent can preferably be used as the electrolyte solution. An aprotic solvent such as carbonates, esters, ethers, nitriles, sulfones, lactones, and so forth can be used as this nonaqueous solvent.

This supporting electrolyte can be one or two or more selections from the various lithium salts known to be capable of functioning as supporting electrolytes in the electrolyte solutions in lithium ion secondary batteries, e.g., $LiPF_6$. There are no particular limitations on the concentration of the supporting electrolyte (supporting salt), and, for example, it can be the same as in the electrolyte solutions used in conventional lithium ion secondary batteries. Typically the use is preferred of a nonaqueous electrolyte solution that contains the supporting electrolyte at a concentration of approximately 0.1 mol/L to 5 mol/L.

With the goal of further improving the properties of the lithium ion secondary battery 100, the nonaqueous electrolyte solution may further contain an additive such as a film-forming agent, overcharge additive, surfactant, dispersing agent, thickener, and so forth.

The lithium ion secondary battery 100 can be constructed proceeding as described above. During the repetition of charge/discharge in the same manner as for an ordinary lithium ion secondary battery, the lithium ion secondary battery 100 of the present embodiment may undergo a decline in the mobile lithium ions and a decline in the battery capacity. However, the lithium ion secondary battery 100 of the present embodiment is provided with the third electrode 10, which is capable of supplying lithium ion in such cases. Thus, when the battery capacity of the lithium ion secondary battery 100 does undergo a decline, and typically after the lithium ion secondary battery 100 has been brought to a fully charged state (for example, a state in which the lithium ion secondary battery 100 has been charged to SOC of 100% or to near this level), the lithium ion can be replenished into the lithium ion secondary battery 100 by causing the release of the lithium ion from the third electrode 10 by establishing an electrical connection between the third electrode 10 and the positive electrode 50 (positive electrode terminal 42) or negative electrode 60 (negative electrode terminal 44). That is, the capacity of the lithium ion secondary battery 100 can be recovered. Lithium ion release is achieved using the potential difference between the third electrode 10 and the wound electrode assembly 80 as the driving force. Since the potential difference is the driving force, lithium ion replenishment can be carried out on the lithium ion secondary battery 100 without the use of an external power source. The positive electrode 50 (positive electrode terminal 42) is preferably electrically connected to the third electrode 10 in the lithium ion replenishment process because this enables a more uniform supply of the lithium ion to the wound electrode assembly 80.

Since the third electrode 10 faces the flat faces 82 of the wound electrode assembly 80, the migration of the lithium ion to the negative electrode that resides on the outer periphery of the wound electrode assembly 80 is facilitated during capacity recovery of the lithium ion secondary battery 100 according to the present embodiment. In particular, since the third electrode 10 faces the wound electrode assembly 80 across the insulating film 20, the migration of the lithium ion to the negative electrode is then facilitated. In addition to this, migration of the lithium ion into the interior of the wound electrode assembly 80 is also facilitated because the third electrode 10 faces the wound electrode assembly open end faces 84a, 84b, which communicate with the interior of the wound electrode assembly 80. Accordingly, due to the disposition of the third electrode 10 in the present embodiment, migration of the lithium ion to the outer periphery and into the interior of the wound electrode assembly 80 is facilitated and as a result lithium ion replenishment can be carried out in less time than heretofore.

The insulating film 20 here is preferably disposed in a state of intimate contact with the two flat faces 82 of the wound electrode assembly 80 and the faces of the third electrode 10 that face these flat faces 82. In such a disposition, the distance between the wound electrode assembly 80 and the third electrode 10 is only the thickness of the thin insulating film 20, which has the same thickness as a separator, and as a result the lithium ion can easily migrate to the outer periphery of the wound electrode assembly 80 from the third electrode 10 and recovery of the battery capacity through lithium ion replenishment can proceed even more rapidly.

The lithium ion secondary battery 100 can be used in a variety of applications. An example of a favorable application is a drive power source mounted in a vehicle such as an electric vehicle (EV), hybrid vehicle (HV), plug-in hybrid vehicle (PHV), and so forth.

The lithium ion secondary battery 100 can also be used in the form of a battery pack in which typically a plurality thereof are connected in series and/or parallel.

Figure 5:
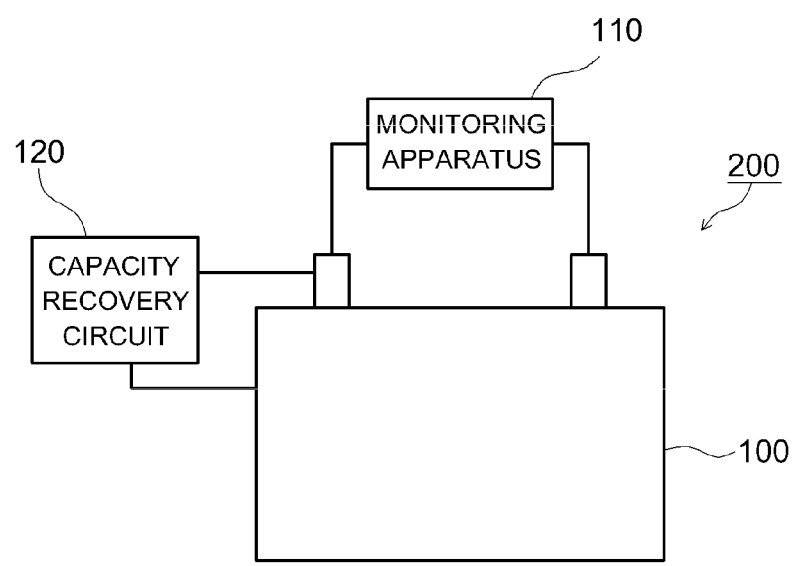
FIG. 5 is a schematic diagram of a battery capacity recovery system according to an embodiment.

In another aspect, and as exemplified in FIG. 5, also disclosed herein is a battery capacity recovery system 200 that is provided with the lithium ion secondary battery 100, a monitoring apparatus 110 (for example, a voltmeter and/or ammeter) that monitors the battery capacity of the lithium ion secondary battery 100, and a capacity recovery circuit 120 that electrically connects the third electrode 10 to the positive electrode 50 in the lithium ion secondary battery 100.

The monitoring apparatus 110 in the battery capacity recovery system 200 disclosed herein monitors the battery capacity of the lithium ion secondary battery 100 using a voltmeter or ammeter. The capacity recovery circuit 120 is cut off when the battery capacity is equal to or greater than a specified value. When, however, the battery capacity is below the specified value, the lithium ion secondary battery 100 is brought to a fully charged state (SOC=100%); the capacity recovery circuit 120 is subsequently connected; and the lithium ion is replenished from the third electrode 10 of the lithium ion secondary battery 100 and the battery capacity of the lithium ion secondary battery 100 is thereby recovered. When the battery capacity of the lithium ion secondary battery 100 has declined, replenishment of the lithium ion is performed in a short period of time by the battery capacity recovery system 200.

In addition to the structural elements shown in FIG. 5, the battery capacity recovery system 200 disclosed herein may contain various other elements in order to carry out the battery capacity recovery process (for example, a control section that controls the execution mode (current value and so forth) of the battery capacity recovery process); however, since such structures may themselves be the same as in a conventional battery capacity recovery system, a more detailed explanation is omitted.

Several examples concerning the present invention are described in the following, but this should not be taken to mean that the present invention is limited to or by that which is given in the examples.

[Secondary Battery Fabrication]

A slurry for forming the positive electrode active material layer was prepared by mixing/kneading $LiNi_{1/3}Co_{1/3}Mn_{1/3}O_2$ as the positive electrode active material, acetylene black as the electroconductive material, and PVDF as the binder in NMP at a mass ratio of 93/4/3. This slurry was coated on both sides of an aluminum foil (positive electrode current collector) followed by drying and then a pressing process to fabricate a positive electrode having a positive electrode active material layer on a positive electrode current collector.

Then, a slurry for forming the negative electrode active material layer was prepared by mixing/kneading graphite as the negative electrode active material, SBR as the binder, and CMC as the thickener in deionized water at a mass ratio of 98/1/1. This slurry was coated on both sides of a copper foil (negative electrode current collector) followed by drying and then roll pressing to fabricate a negative electrode having a negative electrode active material layer on a negative electrode current collector.

Two separators of porous PE film were also prepared.

The positive electrode, separator, negative electrode, and separator were stacked in the indicated sequence and this stack was wound and pressed to prepare a flat wound electrode assembly. Winding was carried out such that the negative electrode is positioned on the outer side of the positive electrode.

Using the same porous PE film as used for the separators, a bag-shaped insulating film was prepared that had a bottom and that was open at the top.

Lead terminals were respectively welded to the positive electrode and the negative electrode of the electrode assembly followed by introduction into the bag-shaped insulating film.

A slurry for forming a positive electrode active material layer was prepared by mixing/kneading the positive electrode active material $LiN_{1/3}Co_{1/3}Mn_{1/3}O_2$ as the Li supply source, acetylene black as the electroconductive material, and PVDF as the binder in NMP at a mass ratio of 93/4/3. This slurry was coated on one side of a thin strip-shaped aluminum sheet followed by drying and then a pressing process to fabricate a third electrode.

In battery No. 1, this strip-shaped third electrode was wrapped on the outer side (disposed so as to enclose the outer side) of the insulating film that housed the wound electrode assembly and this was then introduced into a battery case. Proceeding in this manner, and as shown in FIG. 4, the third electrode in battery No. 1 was made to face, across the interposed insulating film, both the flat faces of the wound electrode assembly and the wound electrode assembly open end faces.

In battery No. 2, the aforementioned strip-shaped third electrode was cut in the longitudinal direction and cut pieces thereof were disposed and adhered only to the two narrow faces among the sides of the insulating film that housed the wound electrode assembly and this was introduced into a battery case. Proceeding in this manner, in battery No. 2 the short cut pieces of the third electrode were made to face, across the interposed insulating film, only the wound electrode assembly open end faces.

In battery No. 3, the aforementioned strip-shaped third electrode was cut in the longitudinal direction and cut pieces thereof were adhered only to the two wide faces among the sides of the insulating film that housed the wound electrode assembly and this was introduced into a battery case. Proceeding in this manner, in battery No. 3 the third electrode was made to face, across the interposed insulating film, only the flat faces of the wound electrode assembly.

For each of the batteries, the battery capacity was made 5 Ah and an Li supply source (a positive electrode active material in this case) having 1 Ah as the utilizable capacity was established for the third electrode.

A nonaqueous electrolyte solution was prepared in which $LiPF_6$ as the supporting salt was dissolved at a concentration of 1.1 mol/L in a mixed solvent containing EC, DMC, and EMC in a volume ratio of 30/40/30. This nonaqueous electrolyte solution was filled into the battery case to obtain lithium ion secondary batteries No. 1 to No. 3.

[Evaluation of the Capacity Recovery Time]

Each of the lithium ion secondary batteries No. 1 to No. 3 was first brought to a fully charged state (SOC=100%). Then, for each of the lithium ion secondary batteries, conduction was established between the positive electrode terminal and the battery case using a lead wire that was provided with an ammeter. With the current being measured by the ammeter, the time required for the passage of an amount of electricity that was 10% of the battery capacity was measured. The results of the measurements are given in Table 1. Here, a shorter current passage time indicates a shorter time required to recover the battery capacity.

TABLE 1

| battery No. | current passage time |
| --- | --- |
| 1 | 21 minutes |
| 2 | at least 10 days |
| 3 | 44 minutes |

As may be understood from Table 1, the current passage time required for recovery of the battery capacity was the shortest for lithium ion secondary battery No. 1, in which the third electrode faced both the flat faces of the wound electrode assembly and the wound electrode assembly open end faces. The current passage time was quite long, at at least 10 days, with lithium ion battery No. 2, in which the third electrode faced only the wound electrode assembly open end faces of the wound electrode assembly. This is thought to be due to the following: since lithium ion supply from the flat faces of the wound electrode assembly did not occur and since the distance between the third electrode and the wound electrode assembly open face ends was on the order of millimeters, the ionic resistance in the electrolyte solution was high and the supply of the lithium ion was thereby impeded.

On the other hand, lithium ion secondary battery No. 3, in which the third electrode faced only the flat faces of the wound electrode assembly, had a current passage time that was much shorter than the current passage time for lithium ion secondary battery No. 2, but longer than the current passage time for lithium ion secondary battery No. 1. This is thought to be due to the following: since the third electrode was closer to the wound electrode assembly than in the lithium ion secondary battery No. 2, supply of the lithium ion to the wound electrode assembly was thus easier; however, since the third electrode did not face the wound electrode assembly open end faces of the wound electrode assembly, supply of the lithium ion into the interior of the wound electrode assembly, which is important for capacity recovery, was not very prominent.

While specific examples of the present invention have been described in detail in the preceding, these are nothing more than examples and do not limit the claims. The art described in the claims includes various modifications and alterations of the specific examples provided above as examples. For example, the wound electrode assembly has been described using the case of a flat wound electrode assembly, but a cylindrical wound electrode assembly can also be used.

What is claimed is:

1. A lithium ion secondary battery comprising:
a wound electrode assembly in which a long sheet-shaped positive electrode and a long sheet-shaped negative electrode are wound using a direction orthogonal to the length direction as a winding axis such that the negative electrode is positioned on the outer side of the positive electrode;
a third electrode that is disposed outside the wound electrode assembly and that has an Li supply source capable of supplying lithium ion; and
a porous insulating film that is disposed between the wound electrode assembly and the third electrode and that is formed from a material usable as a separator in a battery,
wherein the insulating film has a bag shape,
the wound electrode assembly is inserted into the bag-shaped insulating film,
the third electrode has a portion facing, across the insulating film, an outer surface of the negative electrode that constitutes the outermost circumference of the negative electrode of the wound electrode assembly, and has a portion facing, across the insulating film, a wound electrode assembly open end face that communicates with the interior of the wound electrode assembly and is an end face of the wound electrode assembly along the direction of the winding axis,
the wound electrode assembly is formed into a flat shape that has two flat faces between two open end faces in the direction of the winding axis,
the insulating film is disposed in a state of intimate contact with the two flat faces and faces of the third electrode that face the flat faces, and
the third electrode is formed into a strip-shaped sheet and is positioned on the outer periphery of the wound electrode assembly so as to face the two flat faces of the wound electrode assembly and so as to face the two open end faces of the wound electrode assembly.

2. The lithium ion secondary battery according to claim 1, further comprising an electroconductive battery case that houses the wound electrode assembly,
wherein the third electrode is housed in the battery case so as to be electrically conductive with the battery case.

3. The lithium ion secondary battery according to claim 1, wherein the third electrode has, as the Li supply source, an active material that is the same as a positive electrode active material included in the positive electrode.

4. A battery capacity recovery system comprising:
the lithium ion secondary battery according to claim 1;
a monitoring apparatus that monitors the battery capacity of the lithium ion secondary battery; and
a capacity recovery circuit that electrically connects the third electrode to the positive electrode in the lithium ion secondary battery.

* * * * *